Feb. 8, 1955 R. J. THORPE ET AL 2,701,609
FUEL DISTRIBUTING APPARATUS FOR POWER PLANTS
Filed Dec. 5, 1951
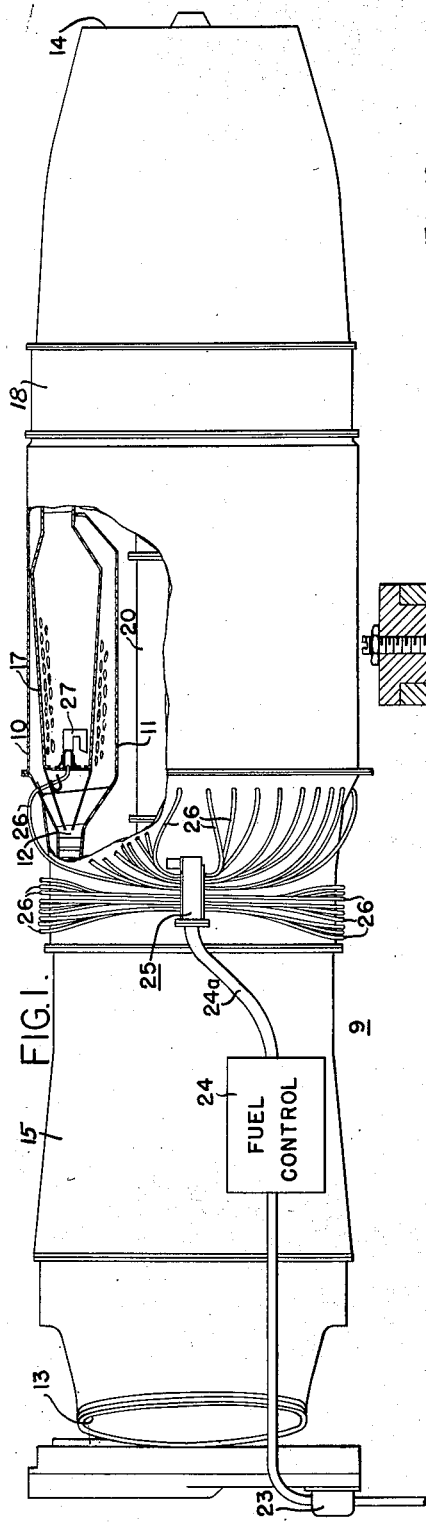
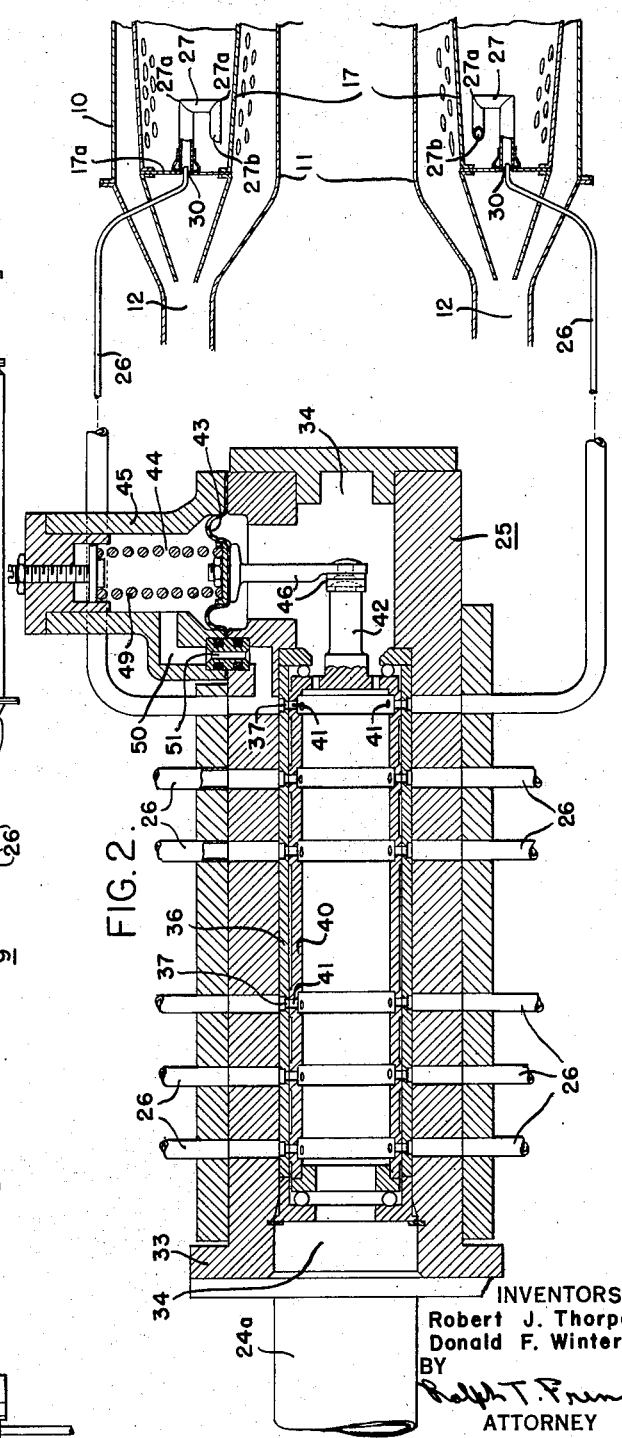
INVENTORS
Robert J. Thorpe
Donald F. Winters
BY
ATTORNEY United States Patent Office 2,701,609
Patented Feb. 8, 1955

2,701,609

FUEL DISTRIBUTING APPARATUS FOR POWER PLANTS

Robert J. Thorpe, Ridley Park, and Donald F. Winters, Folsom, Pa., assignors to Westinghouse Electric Corporation, East Pittsburgh, Pa., a corporation of Pennsylvania Application December 5, 1951, Serial No. 260,062

3 Claims. (Cl. 158—36)

This invention relates to fuel systems, and has for an object the provision of novel fuel dividing and distributing apparatus for an aviation power plant of the continuous combustion type.

It has been proposed to provide fuel distributing means adapted to divide and distribute equal quantities of fuel under predetermined pressure to a plurality of equalizing valves connected to fuel atomizing nozzles, from which fuel is sprayed into the usual combustion chamber or chambers of a continuous combustion engine. Such fuel distributing means as heretofore constructed has necessitated further provision of pressure and flow balancing apparatus, including means for maintaining a control or reference pressure downstream of the flow divider valve device to render uniform the operation of the atomizing nozzles. It is a further object of this invention to provide fuel distributing apparatus dispensing with a reference pressure system, and constructed and arranged for cooperation with fuel discharge means of the fuel vaporizing type, in which a mixture of metered fuel and primary air is preheated prior to introduction thereof into the combustion zone.

Another object is the provision of automatic means for equally distributing any quantity of fuel to vaporizing tubes in a combustion chamber over a wide fuel flow range, on the order of 100 to 1, and with a pressure drop within practical operating limits, such as pressure drops of 50 to 100 p. s. i.

It is also an object of the invention to provide an improved fuel distributing apparatus including a rotary valve device having matched orifices, the flow areas of which are controlled in accordance with movement of a diaphragm that is subject to opposing pressures of inflowing fuel and the force of a spring augmented by the back-up pressure of fuel downstream of the orifices, and a damping orifice disposed in the back-up line on the downstream fuel side of the diaphragm to prevent pulsation of the distributor valve device due to high frequency pressure fluctuations.

These and other objects are effected by the invention as will be apparent from the following description and claims taken in connection with the accompanying drawings, forming a part of this application, in which:

Fig. 1 is a longitudinal view, partly in section, of an aviation turbojet engine equipped with fuel vaporizing apparatus with which is combined fuel distributing apparatus constructed in accordance with the invention; and, Fig. 2 is a fragmentary, enlarged detail sectional view of the fuel distributing apparatus shown in Fig. 1.

In Fig. 1 of the drawings, the invention is illustrated in association with the combustion apparatus of a conventional gas turbine engine 9, which in the form shown comprises a cylindrical outer casing structure 10 having mounted therein a sectional core structure 11, which with the casing structure 10 defines an annular flow passageway 12 that extends longitudinally through the apparatus from a frontal air intake opening 13 to a rearwardly disposed discharge nozzle 14. The casing structure 10 is adapted to be mounted in or on the fuselage or wing of an aircraft (not shown), with the intake opening 13 pointed in the direction of flight. The axially aligned portions of the power plant include an axial flow compressor portion 15, annular fuel combustion apparatus 17, and a turbine portion 18, the rotors of the turbine and compressor (not shown) being operatively connected together through the medium of a shaft 20, which may be suitably journaled in the casing structure. In operation, air drawn into the intake opening 13 is compressed by the compressor and delivered to the combustion apparatus 17, to which fuel is supplied by way of apparatus hereinafter described. The resultant hot motive gas is then supplied from the combustion apparatus to the turbine, and is finally discharged through the nozzle 14 in the form of a jet establishing a propulsive thrust.

The fuel system may comprise a suitable reservoir (not shown) connected by way of an engine driven pump 23 and fuel control apparatus 24 to the inlet pipe 24a of a flow divider valve device 25, which in turn is provided with a plurality of discharge tubes 26, each of which communicates with one of a number of fuel vaporizing tubes 27 mounted in the combustion apparatus 17. The fuel control apparatus 24 may be of any suitable construction adapted to effect metering of fuel to the engine at a desired rate under various operating conditions. By way of example, one type of fuel control apparatus suitable for this purpose is disclosed in the application of Cyrus F. Wood, Serial No. 121,171, filed October 13, 1949 and assigned to the assignee of the present invention.

In a typical power plant such as that illustrated, thirty-six vaporizing tubes 27 may be mounted in circumferentially spaced relation within the upstream end of the annular combustion apparatus 17. As best shown in Fig. 2, an annular upstream end wall 17a of the combustion apparatus is provided with apertures 30 for receiving the open inlet ends of the respective vaporizing tubes 27. The vaporizing tubes have elbow bends 27a, and terminate in outlet ends 27b which face in an upstream direction. The fuel discharge tubes 26 are of smaller diameter than the apertures 30 and vaporizing tubes 27, and open into the inlet ends of the latter with sufficient clearance to admit primary air from the annular passage 12 of the power plant. Such primary air is thus mixed with fuel supplied by way of the fuel discharge tubes 26 and the mixture is preheated during passage through the vaporizing tubes 27, prior to introduction of the mixture into the combustion zone of the combustion apparatus 17.

As shown in Fig. 2 of the drawing, the flow divider valve device 25 comprises a casing structure 33 having a fuel receiving chamber 34 which communicates through the pipe 24a with the discharge side of the fuel control apparatus 24 shown in Fig. 1. Mounted in one end of the chamber 34 is a cylindrical bushing 36 in which are formed a plurality of accurately ground and matched outlet ports 37 corresponding in number to the vaporizing tubes 27. For varying the flow areas of the ports 37 there is provided a sleeve valve member 40, which is rotatably mounted in the bushing 36 and has a plurality of similarly calibrated orifices 41 adapted to register with the respective ports 37. The sleeve valve member 40 has an axial shaft 42 which extends into the closed end of the chamber 34, where a diaphragm 43 is mounted between that chamber and a balancing chamber 44, formed in a casing section 45. The diaphragm 43 is operative to effect turning of the shaft 42 through the medium of suitable linkage 46. Movement of the linkage in both directions may be limited by suitable adjustable stop means (not shown) carried by the casing structure 33. A coil spring 49 is interposed between the diaphragm 43 and an adjustable abutment, carried by a wall of the chamber 44, for biasing the diaphragm toward a normal position, which my be the position in which the flow areas of ports 37 will be a minimum.

Further in accordance with the invention, one of the fuel discharge tubes 26 communicates, at a point downstream of the corresponding port 37, with a passage 50 leading to the diaphragm chamber 44 and including a restricted flow portion or damping orifice 51. The damping orifice 51 is adapted to limit the effect of any pulsations in pressure that might be set up during operation of the fuel system.

It will now be understood that in any position of the rotary sleeve valve 40 of the distributing valve device 25, as determined by operation of the diaphragm 43 in accordance with the differential between the pressure of fuel in chamber 44 and the pressure of fuel supplied from the fuel control apparatus 24 to the chamber 34, the flow areas of all the registering calibrated ports 37 and 41 will be equal and will correspond to fuel demand. Rotation of the sleeve valve 40 is adapted to effect uniform variation in the flow areas of the calibrated ports and through this means the pressure drop across the respective ports can be accurately held to predetermined values over a wide fuel flow range. The pressure drop across the diaphragm 43 is substantially equal to the pressure drop across the registering ports 37 and 41. When the fuel pressure in chamber 34 is increased, it moves the diaphragm 43 outwardly, thereby effecting rotation of sleeve valve 40 to increase the orifice flow areas. Upon a reduction in fuel pressure in chamber 34 below the combined pressure of spring 49 and of the fuel in chamber 44, the sleeve valve 40 will be turned to reduce the flow areas of the said ports 37 and 41.

All of the fuel discharge tubes 26 downstream of the ports 37 are in constant communication with the combustion chamber in the apparatus 17, and thus will conduct fuel at a common back pressure, so that it is unnecessary to provide additional balancing means downstream of the orifices, such as that desirable in the case of a fuel system in which variable orifice atomizing nozzles are employed. Provision of the restricted passage 51 in the communication between the diaphragm chamber 44 and the associated port 37 will ensure damping of pulsations in pressure which might otherwise cause the diaphragm to fluctuate unnecessarily.

While the invention has been shown in but one form, it will be obvious to those skilled in the art that it is not so limited, but is susceptible of various changes and modifications without departing from the spirit thereof.

What is claimed is:

1. In a fuel system, in combination, a source of fuel under pressure, a combustion chamber, a plurality of fuel vaporizing tubes having passages for primary air and fuel and adapted to discharge a mixture thereof into said combustion chamber, an equal number of fuel discharge tubes communicating with said passages in the vaporizing tubes, and a distributing valve device comprising a body having an inlet for receiving fuel under pressure and a plurality of calibrated identical orifices connected to said fuel discharge tubes, respectively, a movable valve element mounted in said body and having ports similarly calibrated and variably registering with said orifices, a spring, a diaphragm subject to the opposing pressures of said spring and of fuel entering said inlet in said body, and means operatively connecting said diaphragm to said valve element.

2. In a fuel system, in combination, a source of fuel under pressure, a combustion chamber, a plurality of fuel vaporizing tubes having passages for primary air and fuel and adapted to discharge a mixture thereof into said combustion chamber, an equal number of fuel discharge tubes communicating with said passages in the vaporizing tubes, and a distributing valve device comprising a body having an inlet for receiving fuel under pressure and a plurality of calibrated identical orifices connected to said fuel discharge tubes, respectively, a movable valve element mounted in said body and having ports similarly calibrated and variably registering with said orifices, a spring, a diaphragm subject to the opposing pressures of said spring and of fuel entering said inlet in said body, said diaphragm being operatively connected to said valve element for effecting equal variations of the flow areas of said orifices, and a restricted passage connecting the space at the spring-pressed side of said diaphragm to one of said fuel discharge tubes downstream of the associated orifice for damping the effect of possible high frequency pulsations in fuel system pressure.

3. In apparatus for distributing fuel from a source of fuel under pressure to a plurality of fuel vaporizing tubes subject to uniform combustion chamber pressure, a control valve device comprising a casing having a fuel receiving chamber communicating with said source and a plurality of identical calibrated ports, fuel discharge communications connecting said ports directly to said vaporizing tubes, respectively, a ported valve element operatively mounted in said fuel receiving chamber and movable to different positions to effect like variations in the flow areas of all said identical ports simultaneously according to the flow of fuel delivered from said source, an operating element for said valve element, means providing a balancing chamber having restricted communication with one of said fuel discharge communications adjacent the downstream side of one of said calibrated ports, a spring disposed in said balancing chamber, and a movable diaphragm subject to force of said spring and interposed between said balancing chamber and said fuel receiving chamber, said diaphragm being operatively connected to said operating element for varying the position of said valve element.

References Cited in the file of this patent
UNITED STATES PATENTS
2,536,440   Greenland _____ Jan. 2, 1951